US007020762B2

(12) United States Patent  
Sprangle et al.

(10) Patent No.: US 7,020,762 B2  
(45) Date of Patent: Mar. 28, 2006

(54) METHOD AND APPARATUS FOR DETERMINING A DYNAMIC RANDOM ACCESS MEMORY PAGE MANAGEMENT IMPLEMENTATION

(75) Inventors: Eric A. Sprangle, Portland, OR (US); Anwar Q. Rohillah, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 10/328,576

(22) Filed: Dec. 24, 2002

(65) Prior Publication Data

US 2004/0123067 A1    Jun. 24, 2004

(51) Int. Cl.  
*G06F 12/00* (2006.01)

(52) U.S. Cl. ..................... 711/204; 711/154; 711/167

(58) Field of Classification Search ............... 711/204, 711/154, 167  
See application file for complete search history.

(56) References Cited

U.S. PATENT DOCUMENTS

| | | | | |
|---|---|---|---|---|
| 5,651,130 | A | * | 7/1997 | Hinkle et al. ............... 711/105 |
| 5,787,267 | A | * | 7/1998 | Leung et al. ............... 711/105 |
| 5,860,106 | A | | 1/1999 | Domen et al. |
| 6,035,377 | A | * | 3/2000 | James et al. ............... 711/147 |
| 6,799,257 | B1 | | 9/2004 | Sprangle et al. |
| 2003/0159008 | A1 | | 8/2003 | Sprangle et al. |
| 2004/0199731 | A1 | | 10/2004 | Sprangle et al. |

OTHER PUBLICATIONS

International Search Report for International Application No. PCT/US03/38727 Mailed Aug. 19, 2004.

* cited by examiner

*Primary Examiner*—Mano Padmanabhan  
*Assistant Examiner*—Kaushik Patel  
(74) *Attorney, Agent, or Firm*—Matthew C. Fagan

(57) ABSTRACT

A system and method for a processor to determine a memory page management implementation used by a memory controller without necessarily having direct access to the circuits or registers of the memory controller is disclosed. In one embodiment, a matrix of counters correspond to potential page management implementations and numbers of pages per block. The counters may be incremented or decremented depending upon whether the corresponding page management implementations and numbers of pages predict a page boundary whenever a long access latency is observed. The counter with the largest value after a period of time may correspond to the actual page management implementation and number of pages per block.

26 Claims, 5 Drawing Sheets

|         | 0 PMI | 1 PMI | 2 PMI | 3 PMI | 4 PMI |
|---------|-------|-------|-------|-------|-------|
| 16 PAGES | 3,0 COUNTER 432 | 3,1 COUNTER 434 | 3,2 COUNTER 436 | 3,3 COUNTER 438 | 3,4 COUNTER 440 |
| 8 PAGES | 2,0 COUNTER 422 | 2,1 COUNTER 424 | 2,2 COUNTER 426 | 2,3 COUNTER 428 | 2,4 COUNTER 430 |
| 4 PAGES | 1,0 COUNTER 412 | 1,1 COUNTER 414 | 1,2 COUNTER 416 | 1,3 COUNTER 418 | 1,4 COUNTER 420 |
| 2 PAGES | 0,0 COUNTER 402 | 0,1 COUNTER 404 | 0,2 COUNTER 406 | 0,3 COUNTER 408 | 0,4 COUNTER 410 |

↑ 336

$i \downarrow$    $t \rightarrow$

FIGURE 4

METHOD AND APPARATUS FOR DETERMINING A DYNAMIC RANDOM ACCESS MEMORY PAGE MANAGEMENT IMPLEMENTATION

FIELD

The present disclosure relates generally to microprocessor systems, and more specifically to microprocessor systems capable of operating with memory controller over a system bus.

BACKGROUND

Dynamic Random Access Memories (DRAMs) may have memory precharge, activate, read, and write operations. In particular, a memory controller that addresses a bank of memory must first precharge the memory bank, then the addressed page within the bank must be activated before the addressed column in that page is accessed (read or written). A "DRAM page open" or a "page hit" indicates the memory being accessed has already been precharged and activated, and data may be read or written from the page without having to precharge or activate the memory during each memory access. When a "page miss" occurs (i.e., data is accessed from a page in memory other than from the page that is open), the open page must be written back to the DRAM chip from the sense amps. Next, the new memory page has to first be precharged and activated before being accessed. Writing the old page to DRAM, and precharging and activating the new DRAM pages takes time and slows down memory accesses resulting in an inefficient use of the memory bus (reduced bandwidth) and a loss in performance of an apparatus (e.g., a computer) employing DRAM.

A processor may interface with system memory, including DRAM, by issuing memory access commands over a system bus to a memory controller. A bus interface circuit of the processor may include a bus scheduler that schedules accesses (reads and writes) from the processor to system memory via a bus access queue. If the bus scheduler could place the memory access requests into the bus access queue in an ordering that reduces page misses and enhances page hits, the access latencies may be reduced. It would be possible to make such a bus scheduler if the processor knew both the memory page management implementation and number of pages per bank, normally controlled by the memory controller. However, this information is generally not available for reading from a memory controller.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a schematic diagram of a set of counters corresponding to possible memory management implementations and numbers of pages of memory per block, according to one embodiment of the present disclosure.

DETAILED DESCRIPTION

The following description describes techniques for a processor to determine a memory page management implementation used by a memory controller without necessarily having direct access to the circuits or registers of the memory controller. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a processor and memory controller connected by a system bus within a microprocessor system, with the system memory connected to the memory controller. However, the invention may be practiced in other configurations of processors and system memory.

Figure 1:
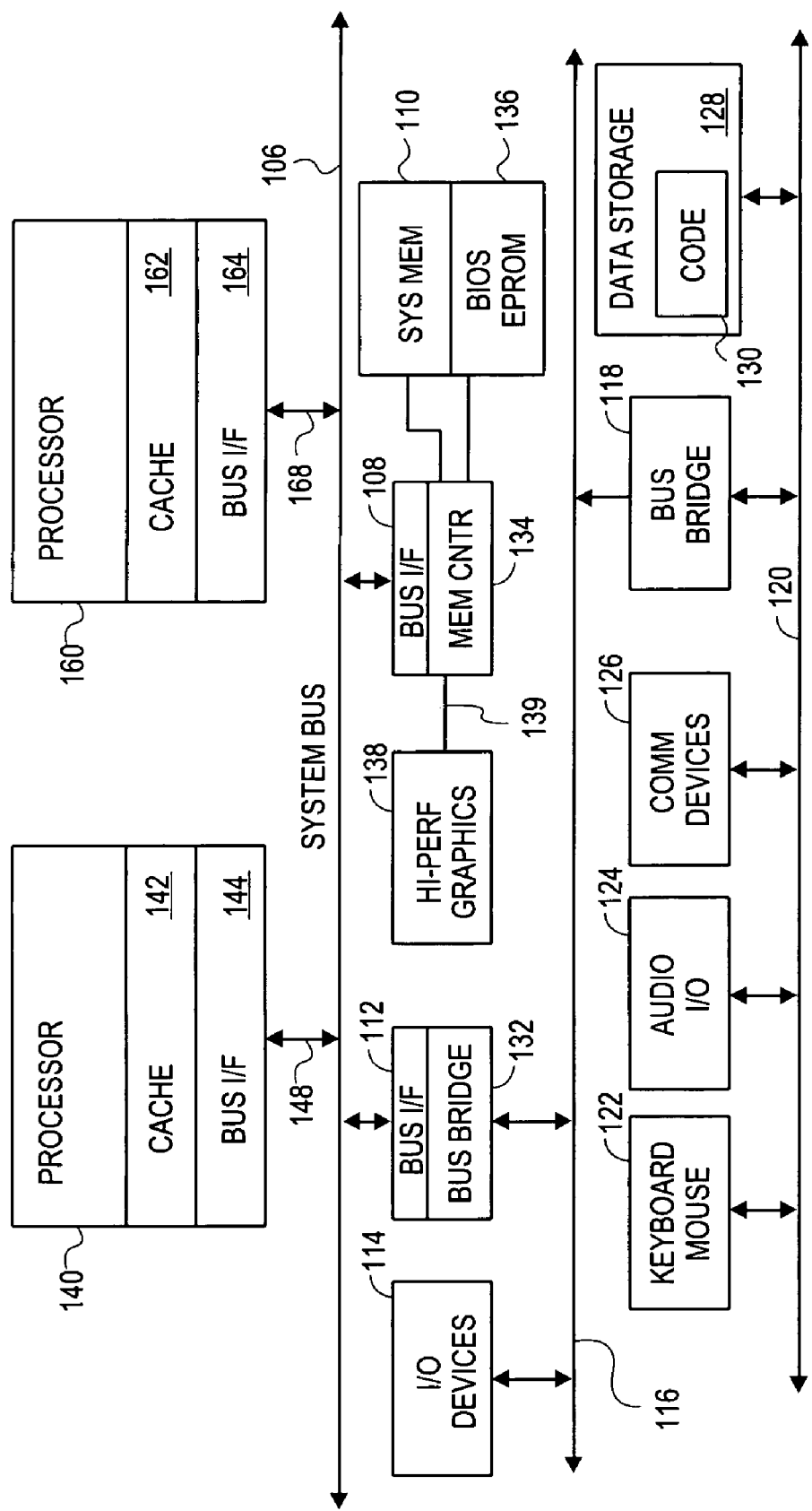
FIG. 1 is a schematic diagram of a multiprocessor system, according to one embodiment.

Referring now to FIG. 1, a schematic diagram of a multiprocessor system 100 is shown, according to one embodiment. The FIG. 1 system may include several processors of which only two, processors 140, 160 are shown for clarity. Processors 140, 160 may include level one caches 142, 162. The FIG. 1 multiprocessor system 100 may have several functions connected via bus interfaces 144, 164, 112, 108 with a system bus 106. In one embodiment, system bus 106 may be the front side bus (FSB) utilized with Pentium® class microprocessors manufactured by Intel® Corporation. A general name for a function connected via a bus interface with a system bus is an "agent". Examples of agents are processors 140, 160, bus bridge 132, and memory controller 134. In some embodiments memory controller 134 and bus bridge 132 may collectively be referred to as a chipset. In some embodiments, functions of a chipset may be divided among physical chips differently than as shown in the FIG. 1 embodiment.

Bus interfaces 144, 164 of processors 140, 160, respectively, may in one embodiment each include a bus access queue to queue memory access requests, a bus scheduler to place memory access requests into the bus access queue, and a page hit predictor to aid the bus scheduler in placing bus access requests in an order to reduce the number of page miss accesses.

Memory controller 134 may permit processors 140, 160 to read and write from system memory 110 and from a basic input/output system (BIOS) erasable programmable read-only memory (EPROM) 136. In some embodiments BIOS EPROM 136 may utilize flash memory. Memory controller 134 may include a bus interface 108 to permit memory read and write data to be carried to and from bus agents on system bus 106. Memory controller 134 may also connect with a high-performance graphics circuit 138 across a high-performance graphics interface 139. In certain embodiments the high-performance graphics interface 139 may be an advanced graphics port AGP interface, or an AGP interface operating at multiple speeds such as 4×AGP or 8×AGP. Memory controller 134 may direct read data from system memory 110 to the high-performance graphics circuit 138 across high-performance graphics interface 139.

Bus bridge 132 may permit data exchanges between system bus 106 and bus 116, which may in some embodiments be a industry standard architecture (ISA) bus or a peripheral component interconnect (PCI) bus. There may be various input/output I/O devices 114 on the bus 116, including in some embodiments low performance graphics controllers, video controllers, and networking controllers. Another bus bridge 118 may in some embodiments be used to permit data exchanges between bus 116 and bus 120. Bus 120 may in some embodiments be a small computer system interface (SCSI) bus, an integrated drive electronics (IDE) bus, or a universal serial bus (USB) bus. Additional I/O devices may be connected with bus 120. These may include keyboard and cursor control devices 122, including mice, audio I/O 124, communications devices 126, including modems and network interfaces, and data storage devices 128. Software code 130 may be stored on data storage device 128. In some embodiments, data storage device 128 may be a fixed magnetic disk, a floppy disk drive, an optical disk drive, a magneto-optical disk drive, a magnetic tape, or non-volatile memory including flash memory.

Figure 2:
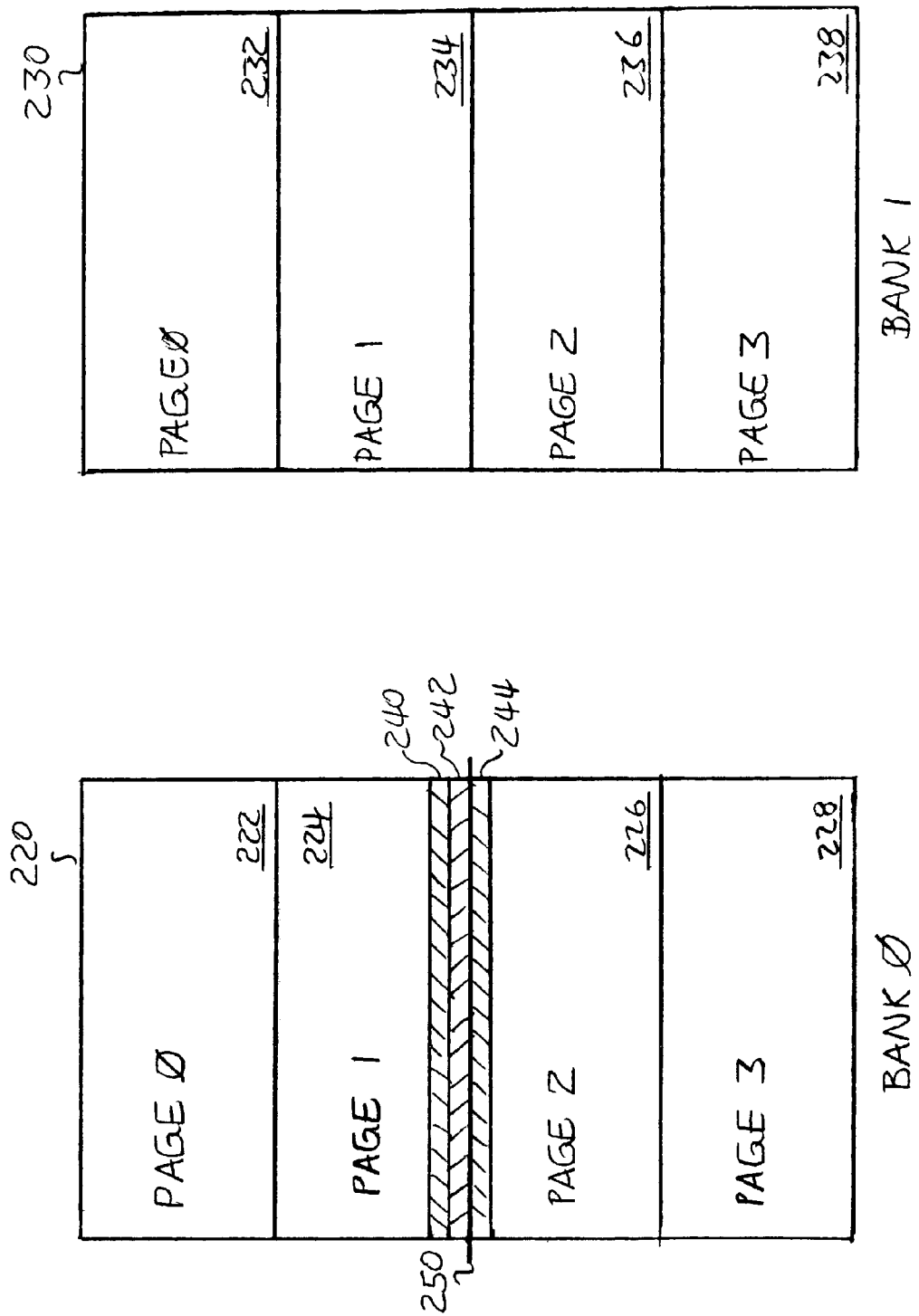
FIG. 2 is a schematic diagram of a memory management implementation, according to one embodiment.

Referring now to FIG. 2, a schematic diagram of a memory management implementation is shown, according to one embodiment. Generally memory is organized in banks, and further subdivided into pages. The specifics of how memory is accessed may be called a memory page management implementation. There may be many possible memory page management implementations for a given memory size. For example, DRAM may be purchased in various specific formats, such as fast page DRAM, extended data out (EDO) DRAM, synchronous DRAM (SDRAM), dual data rate SDRAM (DDR SDRAM), and Rambus® DRAM (RDRAM). It is likely that many more formats may be available in the future. A particular memory page management implementation may be specified by the combination of a memory controller 134 with the system memory 110. Type of memory, size of memory, whether interleaved access is used, and many other factors may go into a particular memory page management implementation.

FIG. 2 shows a possible memory page management implementation. There may be two or more banks of memory, with two shown here as bank 0 220 and bank 1 230. There are four pages shown per bank, but in other embodiments there may be other numbers of pages per bank, including non-equally sized pages. In bank 0 220 these are labeled page 0 222, page 1 224, page 2 226, and page 3 228. In other embodiments, there may be differing numbers of pages in different banks 0 220 and 1 230. The FIG. 2 embodiment presumes that only one page per bank may be open at a time, but other embodiments may enable more than one page to be open at a time.

Consider a sequence of memory accesses 240, 242, 244 in bank 0 220. For this example, assume that page 1 224 is already open. Then page 1 224 remains open during access 240, which is a page hit. A subsequent access 242 on the same page 1 224 should also find page 1 224 open, so access 242 should also be a page hit. However, access 244 is to page 2 226, which at the onset of access 244 is closed. Therefore access 244 should be a page miss. In general, access 244 should take a measurably greater amount of time when compared with access 242.

It would appear that a processor could determine the actual page management implementation by making memory accesses throughout memory and noting when access latency times are longer than the norm. It could be inferred that in those cases memory page boundaries have been traversed. However, in practice this method may not give correct results. For example, there are many other reasons for a given memory access to have an access latency time longer than some norm. DRAM utilizes refresh cycles. An access issued during a refresh cycle may have a latency time longer than the norm. Similarly, in the multiprocessor system shown in FIG. 1, memory accesses issued by processor 140 may be delayed by previous memory accesses issued by processor 160. Not only may memory accesses issued by processor 160 take time by themselves, but they may also open different pages in memory. Both of these effects may impact memory access latencies of accesses issued by processor 140.

Figure 3:
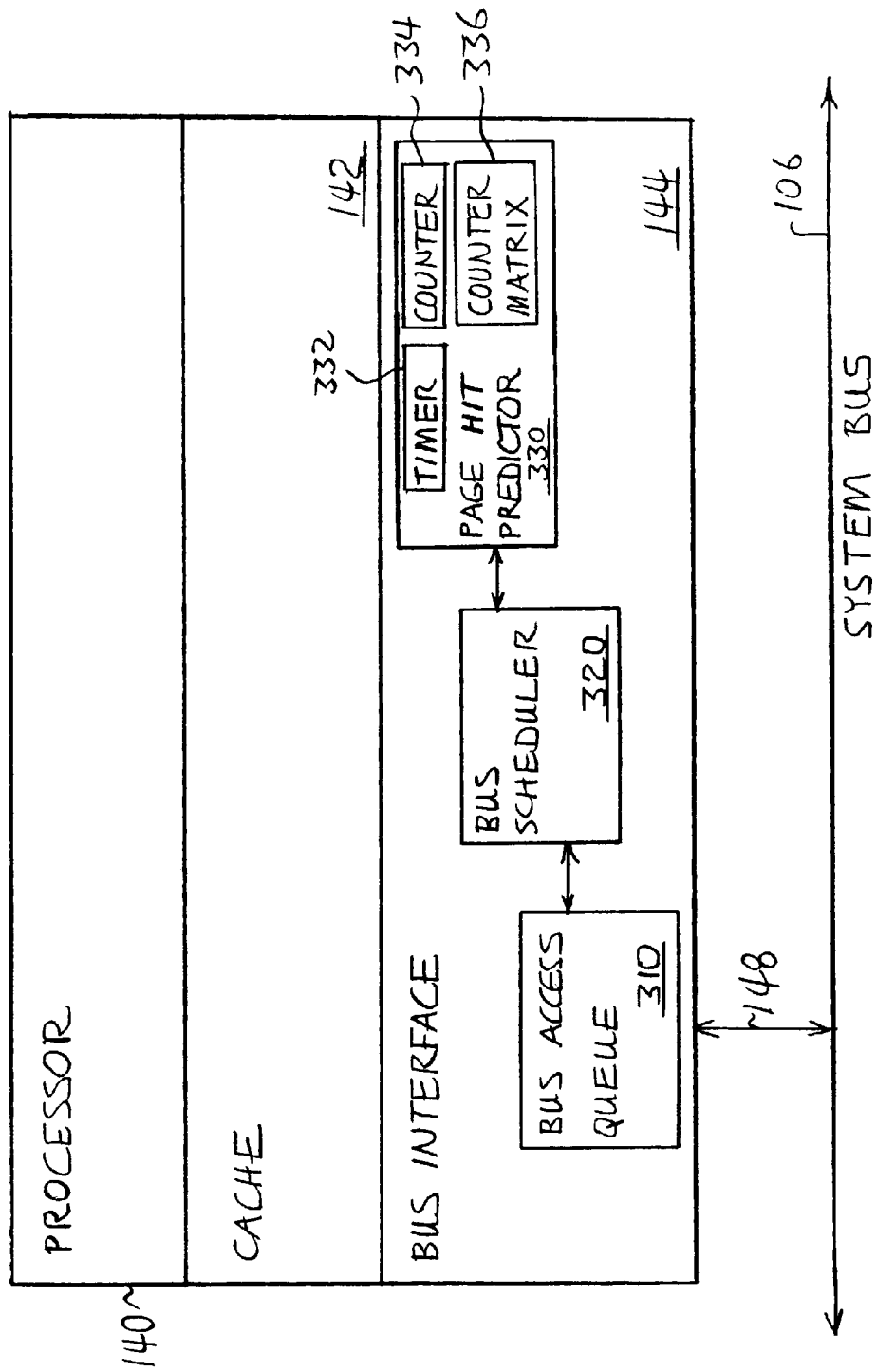
FIG. 3 is a schematic diagram of the bus interface of FIG. 1, according to one embodiment of the present disclosure.

Referring now to FIG. 3, a schematic diagram of the bus interface of FIG. 1 is shown, according to one embodiment of the present disclosure. FIG. 3 illustrates a bus interface, which in one embodiment may be a front side bus (FSB) interface, that schedules memory accesses. The bus interface 144 may include a bus scheduler 320 that schedules DRAM accesses from the processor 140 to DRAM using a bus access queue 310. The bus interface 144 may be coupled to processor 140 via additional busses internal to cache 142, and to the bus interface 108 of memory controller 134 via the system bus 106. The memory controller 134 may be coupled to system memory 110 via a memory bus. In one embodiment, system memory 110 may be DRAM.

Processor 140 may comprise an out-of-order core and a hardware prefetcher (HWP). The out-of-order core may use a pipelining technique wherein multiple instructions are overlapped in execution in an effort to improve the overall performance of the processor. The HWP may prefetch DRAM accesses that are predicted to be eventually needed by execution units in the out-of-order core.

The bus interface 144 may include a bus scheduler 320 and a page hit predictor 330. In one embodiment, the bus scheduler 320 may be coupled to the page hit predictor 330, and the bus scheduler 320 may be coupled to the bus access queue 310. Alternate embodiments may have both the page hit predictor 330 and the bus scheduler 320 coupled to the bus access queue 310. In one embodiment, the bus scheduler 320 schedules accesses from the processor 140 (i.e., from the out-of-order core and from the HWP) to system memory 110 based upon the application, or portions of the application, that is being processed by the processor. For example, if the application being processed is latency tolerant, the bus scheduler 320 may schedule memory accesses for taking advantage of the available memory bus bandwidth.

Alternatively, if the application being processed is latency intolerant, the bus scheduler 320 may schedule memory accesses to reduce memory access latency. In other words, the bus scheduler 320 may arrange memory accesses in the bus access queue 310 based upon the characteristics of the application being processed by processor 140. An application may be latency intolerant, for example, when a memory access is needed to resolve a branch misprediction. In this example, the speculative work performed by the core when a branch is mispredicted may be useless until the memory access is complete and the processor fetches instructions from the correct path of program execution. In order to determine whether an application is "latency tolerant" or "latency intolerant", the bus scheduler 320 may monitor the memory accesses generated by the HWP and by the out-of-order core.

In order to schedule system memory accesses that are predicted to access data from an open page of system memory, the bus scheduler 320 may utilize the page hit predictor 330. In one embodiment, the page hit predictor 330 may keep track of the history of pages within system memory that are accessed, and, based on the history of the pages that are accessed, the page hit predictor 320 may generate a list of pages within system memory predicted to be open. For example, if pages 12, 14, 16 and 18 were accessed in the past, and the page management implementation of system memory 110 allows for 4 pages to be simultaneously open, then the page hit predictor may predict that a new access to page 12 will hit, and a new access to page 13 will miss. In one embodiment of the invention, the page hit predictor 330 may generate (or update) the list of pages predicted to be open in system memory at least every memory bus cycle. In other embodiments, the page hit predictor 330 may generate (or update) the list of pages predicted to be open in system memory every few (e.g., 2 or more) memory bus cycles.

In order to determine the open pages in memory, page hit predictor 330 should know the actual page management implementation of system memory 110. This may be difficult in many embodiments, because processor 140 may not have direct access to those portions of memory controller 134 that indicate the actual page management implementation. And, as noted in the discussion of FIG. 2 above, performing memory accesses throughout memory and attempting to deduce the location of memory page boundaries simply by noticing increased memory access latencies may not give correct results.

Therefore, in one embodiment of the present disclosure page hit predictor 330 may include additional circuitry to aid in the determination of the actual page management implementation of the system. In the FIG. 3 embodiment, a timer 332, an average latency counter 334, and a counter matrix 336 may be used to aid in this determination. In other embodiments, other circuits could be used. In yet other embodiments, a method of the present disclosure may be performed by a software program executing upon a processor.

Timer 332 may be used to give a measured memory access latency time for a given memory access issued by processor 140. In one embodiment, this latency time may be given as the time between the memory access request being issued from the bus access queue 310 over system bus 106 until the read data arrives at bus interface 144 or the write data leaves bus interface 144. A timer 332 may be implemented using circuits that are well-known in the art.

Average latency counter 334 may be used to track a running average latency of memory accesses issued from processor 140. Generally there may be nominal memory access times for certain kinds of DRAM. For example, in one DRAM example a memory access latency of 125 nanoseconds may be expected for a page hit, and 180 nanoseconds may be expected for a page miss. These values are generally static and do not vary in time. Some DRAMs may have a third possible nominal memory access time corresponding to an access to a "page empty" condition. The page empty condition may occur when none of the read circuits of a bank are charged (i.e. none of the pages are open), so although read circuits corresponding to the accessed page need to be charged, no open page exists that must be written back into DRAM from the sense amps. For this reason, a memory access to a page empty bank may have a nominal access latency someplace between that of a page hit and a page miss condition.

It would be possible in some embodiments to use one or a combination of the above static memory access times as an average latency. However, the average latency counter 334 may be used to give a running average latency. The average latency counter 334 may be initialized to some chosen value. Then for each memory access latency observed, the new value is combined with the contents of average latency counter 334 to yield a new value of average latency. In one embodiment, average latency counter 334 may be incremented by 1000 each time a memory access is completed. Then average latency counter 334 may be multiplied by 0.999 each clock cycle. If nominally a memory access completes every 100 clock cycles, then the average return latency may be [$10^5$/(contents of average latency counter)]. In other embodiments, other implementations of an average latency counter may be used in order to give other running average latency values.

The counter matrix 336 may include a great number of counters, each of which may correspond both to a particular possible page management implementation and to a particular possible number of pages per bank. For each memory access that occurs, the counter matrix 336 may calculate, for each of the combinations of particular possible page management implementations and number of pages per bank, a prediction of whether or not a page boundary would be crossed when compared with the immediately previous memory access. When the difference between a memory access latency (as in one embodiment produced by timer 332) and the average latency (as in one embodiment produced by average latency counter 334) is greater than a selected threshold value, then all the counters of counter matrix 336 may be either incremented or decremented. A particular counter may be decremented if the prediction of whether or not a page boundary would be crossed when compared with the immediately previous memory access is false. On the other hand, a particular counter may be incremented if the prediction of whether or not a page boundary would be crossed when compared with the immediately previous memory access is true. In one embodiment, the amount the counters may be incremented is 10 and the amount the counters may be decremented is 1. Other amounts may be chosen. In this manner, after a period of time the counter with the greatest value may be inferred to correspond to the actual page management implementation and the actual number of pages per bank.

The circuits shown in FIG. 3 presuppose that the page management implementation and number of pages per bank may be the same across the various banks within system memory. In other embodiments, additional counter matrices may be added to correspond to banks with differing page management implementations and numbers of pages per bank.

Referring now to FIG. 4, a schematic diagram of a set of ij counters corresponding to possible memory management implementations and numbers of pages of memory per block is shown, according to one embodiment of the present disclosure. The set of ij counters is shown as being organized into the regular counter matrix 336 of FIG. 3. However, in other embodiments the set of ij counters may be organized other than as a matrix.

Across the top of the counter matrix 336 are a number of possible page management implementations (PMI), labeled 0 PMI, 1 PMI, up to 4 PMI. There may be more or fewer page management implementations in a given embodiment. In some embodiments, there may be extra columns in a counter matrix to allow for the addition of new forms of page management implementations at a future time. Examples of a j'th MPI may be "fast page—noninterleaved", "fast page—interleaved", "EDO—noninterleaved", "EDO—interleaved", and many other kinds of page management implementations.

Up the left side of counter matrix 336 are shown numbers of pages per bank in a bank. The FIG. 4 embodiment shows the i number of pages per bank as powers of 2. However, in other embodiments other sequences of values could be used. In some embodiments, there may be extra rows in a counter matrix to allow for the addition of new numbers of pages per bank at a future time.

Each of the ij counters shown in FIG. 4 correspond to the j'th possible page management implementation and the i'th number of pages per bank. For example, the 2,3 counter 428 corresponds to the 3rd page management implementation and the 2nd number of pages (8 pages) per bank. After the process as described above in connection with FIG. 3 is performed, the ij counter that contains the highest value will correspond to the actual page management implementation and the actual number of pages per bank. For example, if the 2,1 counter 424 contains the highest value, then the $1^{st}$ page management implementation will be the actual one, and the $2^{nd}$ number of pages per bank (8 pages) will be the actual number of pages.

Determining the highest value in an ij counter may be performed in differing ways. In one embodiment, a fixed threshold M may be chosen, and when any of the ij counters equals or exceeds M the process may be halted. In other embodiments the counters may run for a non-limited amount of time and read when necessary. It is noteworthy that in some circumstances the actual page management implementation may not be listed in a given counter matrix. However, the potential page management implementation that corresponds to the ij counter with the largest value may still be used to advantage when used in a page hit predictor such as page hit predictor 330.

Figure 5:
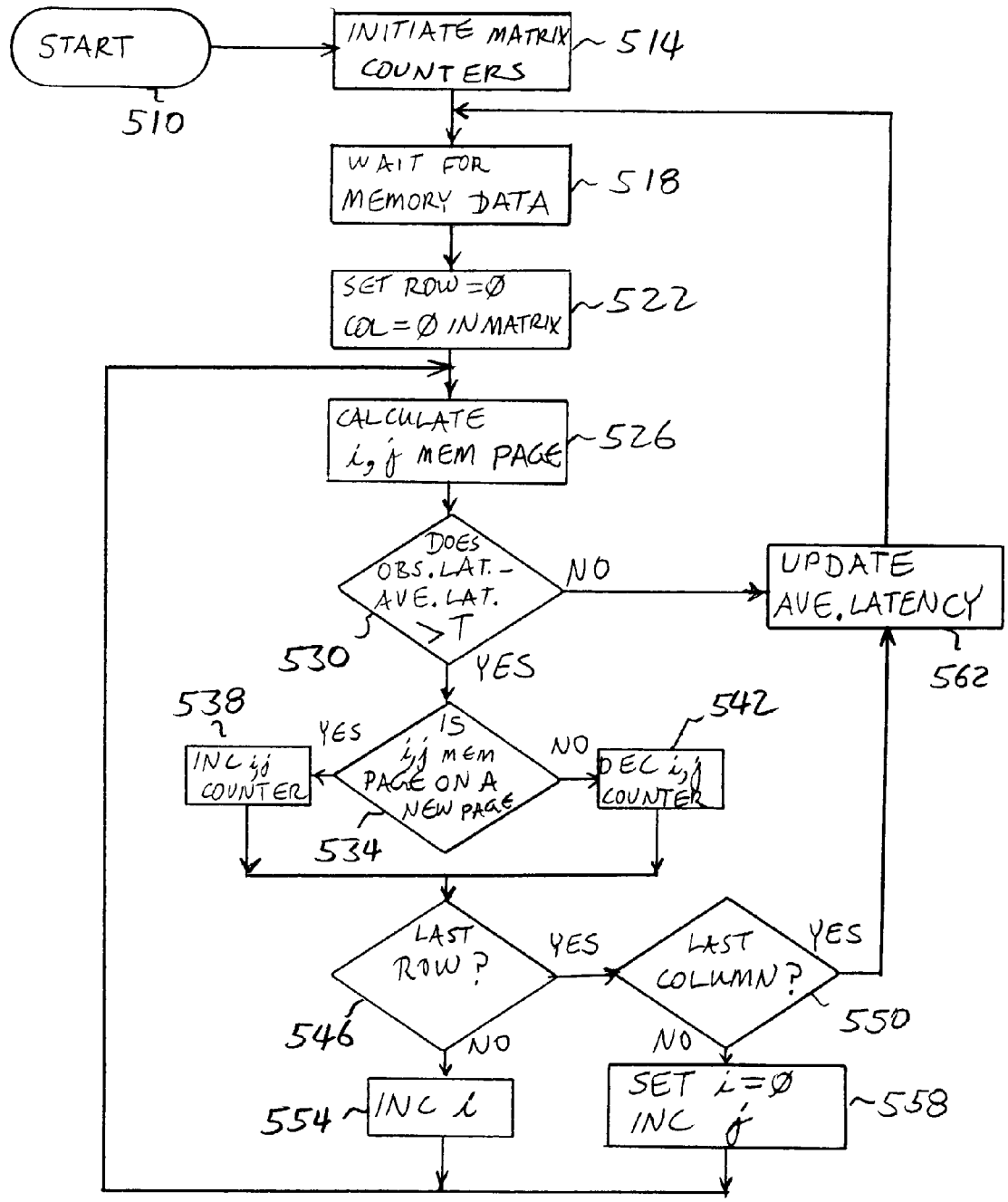
FIG. 5 is a flowchart diagram of a method, according to one embodiment of the present disclosure.

Referring now to FIG. 5, a flowchart diagram of a method is shown, according to one embodiment of the present disclosure. The process shown discusses read memory accesses for clarity, but write memory accesses may also be used. The FIG. 5 process begins at block 514, where an initial value may be placed into the various ij counters of the counter matrix. At this time an initial value for average latency may be used to initiate the average latency counter. Then in block 518 the process waits for data to arrive from memory. When data arrives from memory, in block 522 the process begins at row 0, column 0 of the counter matrix. In block 526 the predicted location on a page according to the i'th number of pages and the j'th page management implementation may be made for the current memory access. Then in decision block 530 it may be determined whether or not the difference between the observed latency and the average latency exceeds a threshold value T.

If the result of decision block 530 is YES, then the process proceeds to decision block 534. In decision block 534, it may be determined whether or not the predicted location on a page determined in block 526 is on a different page than that predicted for the immediately preceding memory access. If the result of decision block 534 is YES, then the process increments the ij counter in block 538. If however the result of decision block 534 is NO, then the process decrements the ij counter in block 542. In either case, the process then proceeds to decision block 546, where it may be determined whether or not the process is on the last row of the counter matrix. If the answer is NO, then in block 554 the value of i is incremented and the process repeats at block 526. If the answer is YES, then the process proceeds to decision block 550, where it may be determined whether or not the process is on the last row of the counter matrix. If the answer is NO, then in block 558 the value of i is reset to 0 and the value of j is incremented. Then process then repeats to block 526. If, however, the answer is YES, then the average latency value is updated in block 562, and the process returns to wait for data at block 518.

Returning back to decision block 530, if the determination made there is NO, then the average latency value is also updated in block 562, and the process returns to wait for data at clock 518.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A bus interface, comprising:
   a bus access queue to queue memory access requests;
   a bus scheduler to schedule memory access requests into said bus access queue; and
   a page hit predictor to give page hit prediction data to said bus scheduler, including a matrix of ij counters, where i corresponds to a number of memory pages in a bank and j corresponds to a possible page management implementation.

2. The bus interface of claim 1, including a timer to determine an observed latency.

3. The bus interface of claim 2, including an average latency counter to determine an average latency.

4. The bus interface of claim 3, wherein said page hit predictor is to determine whether said observed latency minus said average latency is greater than a threshold value.

5. The bus interface of claim 4, wherein said page hit predictor is to set a logical signal true when that said possible page management implementation corresponding to j and said number of memory pages corresponding to i predicts a current memory access to be on a new memory page compared with a previous memory access.

6. The bus interface of claim 5, wherein one of said ij counters is incremented when said logical signal is true.

7. The bus interface of claim 5, wherein one of said ij counters is decremented when said logical signal is false.

8. A method, comprising:
   establishing a set of counters corresponding to combinations of possible page management implementations and numbers of memory pages in a block;
   determining whether an observed latency for a memory access exceeds an average latency; and
   if an observed latency for a memory access exceeds an average latency, then incrementing one of said counters when a corresponding combination of possible page management implementation and number of memory pages predicts said memory access to be on a different page than a previous memory access.

9. The method of claim 8, wherein said determining includes determining whether said observed latency for a memory access minus said average latency exceeds a threshold value.

10. The method of claim 8, further comprising, if an observed latency for a memory access exceeds an average latency, then decrementing one of said counters when a corresponding combination of possible page management implementation and number of memory pages predicts said memory access not to be on a different page than a previous memory access.

11. The method of claim 8, further comprising updating said average latency.

12. The method of claim 8, further comprising determining a maximum of a set of values of said set of counters.

13. The method of claim 12, further comprising furnishing a possible page management implementation and a number of memory pages corresponding to one of said counters having a value that is said maximum to a page hit predictor.

14. A computer readable media including program instructions which when executed by a processor perform the following:
- establishing a set of counters corresponding to combinations of possible page management implementations and numbers of memory pages in a block;
- determining whether an observed latency for a memory access exceeds an average latency; and
- if an observed latency for a memory access exceeds an average latency, then incrementing one of said counters when a corresponding combination of possible page management implementation and number of memory pages predicts said memory access to be on a different page than a previous memory access.

15. The computer readable media of claim 14, wherein said determining includes determining whether said observed latency for a memory access minus said average latency exceeds a threshold value.

16. The computer readable media of claim 14, further comprising, if an observed latency for a memory access exceeds an average latency, then decrementing one of said counters when a corresponding combination of possible page management implementation and number of memory pages predicts said memory access not to be on a different page than a previous memory access.

17. The computer readable media of claim 14, further comprising updating said average latency.

18. The computer readable media of claim 14, further comprising determining a maximum of a set of values of said set of counters.

19. The computer readable media of claim 18, further comprising furnishing a possible page management implementation and a number of memory pages corresponding to one of said counters having a value that is said maximum to a page hit predictor.

20. A system, comprising:
- a processor including a bus access queue to queue memory access requests; a bus scheduler to schedule memory access requests into said bus access queue; and a page hit predictor to give page hit prediction data to said bus scheduler, including a matrix of ij counters, where i corresponds to a number of memory pages in a bank and j corresponds to a possible page management implementation;
- a system bus coupled to said processor;
- a memory controller coupled to said system bus to receive said memory access requests; and
- an audio input/output device coupled to said system bus.

21. The system of claim 20, wherein said processor includes a timer to determine an observed latency.

22. The system of claim 21, wherein said processor includes an average latency counter to determine an average latency.

23. The system of claim 22, wherein said page hit predictor is to determine whether said observed latency minus said average latency is greater than a threshold value.

24. The system of claim 23, wherein said page hit predictor is to set a logical signal true when that said possible page management implementation corresponding to j and said number of memory pages corresponding to i predicts a current memory access to be on a new memory page compared with a previous memory access.

25. The system of claim 24, wherein one of said ij counters is incremented when said logical signal is true.

26. The system of claim 25, wherein one of said ij counters is decremented when said logical signal is false.

* * * * *